United States Patent
Kouno et al.

(10) Patent No.: US 7,916,893 B2
(45) Date of Patent: Mar. 29, 2011

(54) IMAGE PROCESSING APPARATUS, IMAGE PROCESSING METHOD, AND PROGRAM

(75) Inventors: Katsuyuki Kouno, Kanagawa (JP); Hirofumi Komatsubara, Kanagawa (JP); Fujio Ihara, Kanagawa (JP); Kenji Ebitani, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1008 days.

(21) Appl. No.: 11/518,211

(22) Filed: Sep. 11, 2006

(65) Prior Publication Data

US 2007/0172122 A1 Jul. 26, 2007

(30) Foreign Application Priority Data

Jan. 24, 2006 (JP) .................... 2006-015426

(51) Int. Cl.
G06K 9/00 (2006.01)
G01C 22/10 (2006.01)
G01N 37/00 (2006.01)

(52) U.S. Cl. .............. 382/103; 701/28; 702/82

(58) Field of Classification Search .......... 382/103, 382/107, 162, 232, 236, 287, 165, 175, 181; 348/94, 154, 155, 169, 170, 171, 172, 208.1, 348/208.2, 208.14, 208.16; 701/28; 702/82
See application file for complete search history.

(56) References Cited

U.S. PATENT DOCUMENTS

| | | | | |
|---|---|---|---|---|
| 6,115,492 A * | 9/2000 | Meltzer et al. | ........... | 382/162 |
| 6,961,466 B2 * | 11/2005 | Imagawa et al. | ........... | 382/190 |
| 7,298,412 B2 * | 11/2007 | Sannoh et al. | ........... | 348/348 |
| 2004/0234139 A1 * | 11/2004 | Moroo et al. | ........... | 382/232 |
| 2005/0117033 A1 * | 6/2005 | Matsui | ........... | 348/239 |
| 2005/0234333 A1 * | 10/2005 | Takemoto et al. | ........... | 600/426 |

FOREIGN PATENT DOCUMENTS

| | | |
|---|---|---|
| JP | A-06-274686 | 9/1994 |
| JP | A-06-311333 | 11/1994 |
| JP | A 2002-544637 | 12/2002 |
| JP | A 2004-213215 | 7/2004 |
| JP | A 2004-349879 | 12/2004 |
| WO | WO 00/70585 | 11/2000 |

OTHER PUBLICATIONS

Sep. 7, 2010 Japanese Office Action issued in Japanese patent application No. 2006-015426 (with translation).

* cited by examiner

Primary Examiner — Abolfazl Tabatabai
(74) Attorney, Agent, or Firm — Oliff & Berridge, PLC

(57) ABSTRACT

An image processing apparatus includes an image capturing section, a marker-image defecting section, a judging section and an output section. The image capturing section captures at least a part of a target image, which includes a plurality of marker images and a recognition target range defined by the plurality of marker images, to acquire a captured image. The marker-image detecting section detects the marker images from the captured image. The judging section judges based on a detection result, whether or not the recognition target range is included in the captured image. When the judging section judges that the recognition target range is not included in the captured image, the output section outputs guidance for capturing the recognition target range.

15 Claims, 8 Drawing Sheets

IMAGE PROCESSING APPARATUS, IMAGE PROCESSING METHOD, AND PROGRAM

BACKGROUND

Technical Field

The invention relates to an image processing apparatus, an image processing method and a program for performing image processing on a captured image obtained by capturing a target image.

There is a technique using an image processing apparatus, which includes an image capturing section, such as a portable phone or a digital camera to capture a target image formed on a medium such as paper to acquire a captured image, and to extract information from the captured image. This type image processing apparatus captures a target image including an image region (recognition target range) representing a two-dimensional code such as a bar code or a QR code (registered trademark), a character, etc., and executes recognition processing such as analysis of code information or OCR processing on the recognition target range, so that digital data represented by these codes can be acquired.

SUMMARY

According to an aspect of the invention, an image processing apparatus includes an image capturing section, a marker-image detecting section, a judging section and an output section. The image capturing section captures at least a part of a target image, which includes plural marker images and a recognition target range defined by the plural marker images, to acquire a captured image. The marker-image detecting section detects the marker images from the captured image. The judging section judges based on a detection result, whether or not the recognition target range is included in the captured image. When the judging section judges that the recognition target range is not included in the captured image, the output section outputs guidance for capturing the recognition target range.

BRIEF DESCRIPTION OF THE DRAWINGS

Exemplary embodiments of the invention will be described in detail based on the following figures, wherein.

DETAILED DESCRIPTION

Figure 1:
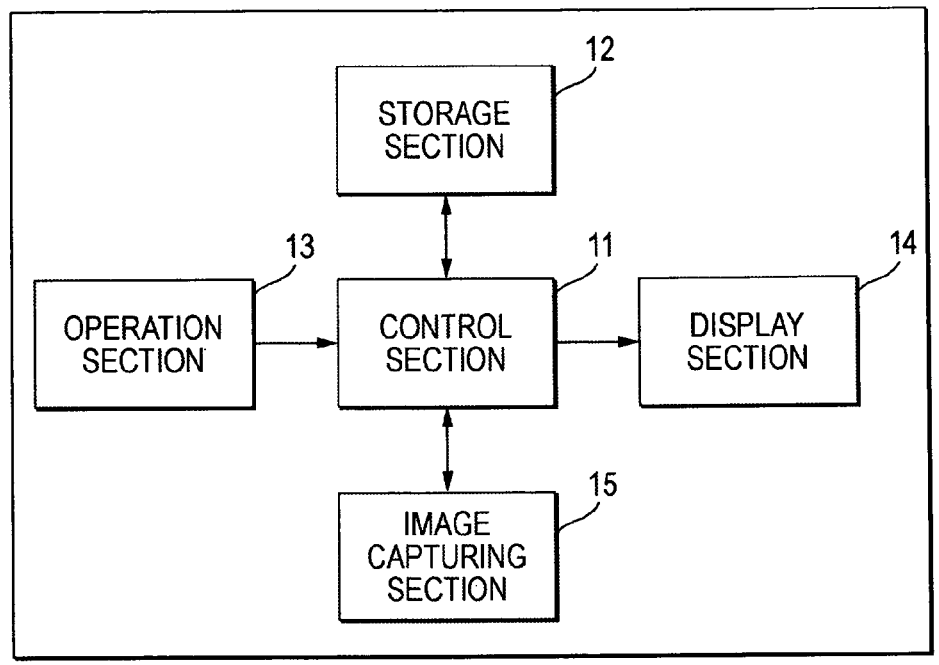
FIG. 1 is a block diagram showing a schematic confirmation of an image processing apparatus according to an exemplary embodiment of the invention.

An exemplary embodiment of the invention will be described below with reference to the drawings. As shown in FIG. 1, an image processing apparatus 10 according to an exemplary embodiment of the invention includes a control section 11, a storage section 12, an operation section 13, a display section 14, and an image capturing section 15.

The control section 11 is a CPU or the like which operates in accordance with programs stored in the storage section 12. In this embodiment, the control section 11 controls the image capturing section 15 to capture a target image to thereby acquire a captured image. Image processing such as detection of marker images is executed on the captured image. Moreover, the control section 11 controls the display section 14 to display guide images which will be described later. Description about examples of processing to be executed by the control section 11 will be made in more detail later.

The storage section 12 is a computer-readable storage medium in which the programs to be executed by the control section 11 are stored. The storage section 12 includes at least one of a memory device such as an RAM or an ROM and a disc device. The storage section 12 also operates as a work memory for the control section 11.

For example, the operation section 13 includes operating buttons and a touch panel. The operation section 13 outputs the contents of a user's instruction operation to the control section 11. For example, the display section 14 is a display etc. which displays information based on control of the control section 11.

The image capturing section 15 is a CCD camera or the like which captures an image formed on a medium as a target to be photographed, and outputs image data of the thus obtained captured image to the control section 11.

Figure 2:
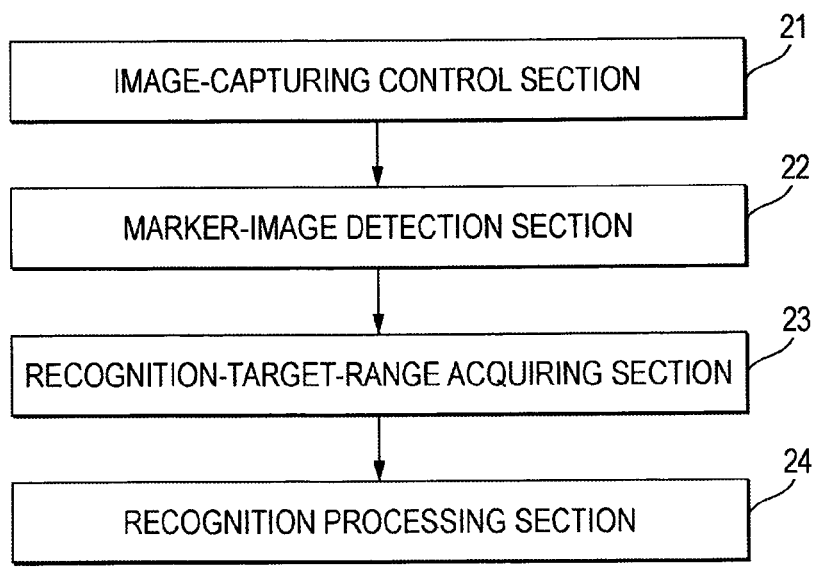
FIG. 2 is a functional block diagram showing functions of the image processing apparatus according to the exemplary embodiment of the invention.

As shown in FIG. 2, the image processing apparatus 10 functionally includes an image-capturing control section 21, a marker-image detection section 22, a recognition-target-range acquiring section 23, and a recognition processing section 24. For example, these functions can be achieved by the control section 11 which executes the programs stored in the storage section 12.

The image-capturing control section 21 controls the image capturing section 15 to capture a target image, so as to acquire a captured image. In addition, the image-capturing control section 21 displays the acquired captured image on the display section 14 so as to present the captured image to the user. Further, the image-capturing control section 21 stores image data representing the captured image in the storage section 12 in accordance with a user's instruction operation on the operation section 13.

In addition, when the captured image is displayed on the display section 14, the image-capturing control section 21 may further display a target-region guide image and a size guide image on the display section 14 in the condition that the two guide images are superimposed on the captured image. For example, the image-capturing control section 21 displays these guide images when a predetermined photographic mode such as a two-dimensional code acquisition mode is started in accordance with a user's instruction operation on the operation section 13. Details of these guide images will be described later.

By performing image processing on the captured image acquired by the image-capturing control section 21, the marker-image detection section 22 detects each marker image included in the captured image to acquire the position of the marker image in the captured image. This can be achieved, for example, by the following processing. That is, first, the marker-image detection section 22 acquires a two-valued image by applying a two-valuing process to the captured image. Then, a labeling process is applied to pixels with a predetermined pixel value (a bit of "1" or "0") included in the two-valued image, so that connected images obtained by connecting the pixels are extracted and labeled. Then, images each having a size included in a predetermined range are selected as marker image candidates from the labeled connected images. Then, a matching process is applied to each of the selected marker image candidates as to whether the marker image candidate matches with a marker image pattern stored in the image processing apparatus 10. Thus, a value (coincidence degree) representing similarity of the marker image candidate to the marker image is obtained. Here, the matching process may be performed by use of a marker image pattern subjected to size correction in accordance with each selected marker image candidate. When the similarity of a marker image candidate is not smaller than a predetermined threshold, the marker-image detection section 22 determines the marker image candidate as a marker image.

The marker-image detection section 22 may detect the position of the marker image in the captured image and specify the size of the marker image. When there are a plurality of kinds of marker images included in the target image, the marker-image detection section 22 may specify the kind of each detected marker image. For example, the kind of each marker image can be specified in accordance with the shape, color or size of the marker image. As an example, the marker-image detection section 22 can detect marker images with a specific component color by applying the two-valuing process to pixels included in the captured image on the basis of the concentration value of the specific component color of each pixel in a predetermined color space (e.g. blue in an RGB color space). Moreover, a plurality of marker image patterns may be stored so that marker images with a specific shape can be detected by applying the matching process to the marker image candidates and the marker image patterns.

The recognition-target-range acquiring section 23 acquires a recognition target range included in the captured image acquired by the image-capturing control section 21, on the basis of a detection result etc. of the marker images by the marker-image detection section 22. When the recognition target range can be acquired, the recognition-target-range acquiring section 23 judges whether or not the acquired recognition target range satisfies predetermined conditions required for performing recognition processing.

When the recognition target range cannot be acquired or when the acquired recognition target range does not satisfy the predetermined conditions, the recognition-target-range acquiring section 23 executes a predetermined process, such as outputting of correction guide information to the user. In this manner, the user can know how to correct the image-capturing range or a distance to the target image so as to capture the captured image including the recognition target range in desirable conditions.

For example, the recognition-target-range acquiring section 23 may output the correction guide information in such a manner that a correction guide image, which represents message information or the contents of a predetermined instruction, is displayed on the display section 14. The recognition-target-range acquiring section 23 may output the correction guide information in such a manner that message information etc. is output by voice from speakers (not shown). Or, the recognition-target-range acquiring section 23 may output the correction guide information in such a manner that a lamp (not shown) is turned on or blinked on/off.

The recognition processing section 24 executes recognition processing on the recognition target range acquired by the recognition-target-range acquiring section 23. Specific examples of the recognition processing will be given as follows. That is, the recognition processing is a process of acquiring a character code represented by a character image when the recognition target range includes the character image. The recognition processing is a process of acquiring data represented by a code image of a bar code, a two-dimensional code, etc. by a predetermined analysis process when the recognition target range includes the code image. The recognition processing is a process of extracting embedded target data by a method coping with a digital watermarking technique used for embedding, when the recognition target range is an image region where the target data is embedded by the digital watermarking technique.

Next, description will be made on some processing examples in which the image processing apparatus 10 captures a target image so as to acquire a recognition target range from the captured image.

Figure 3:
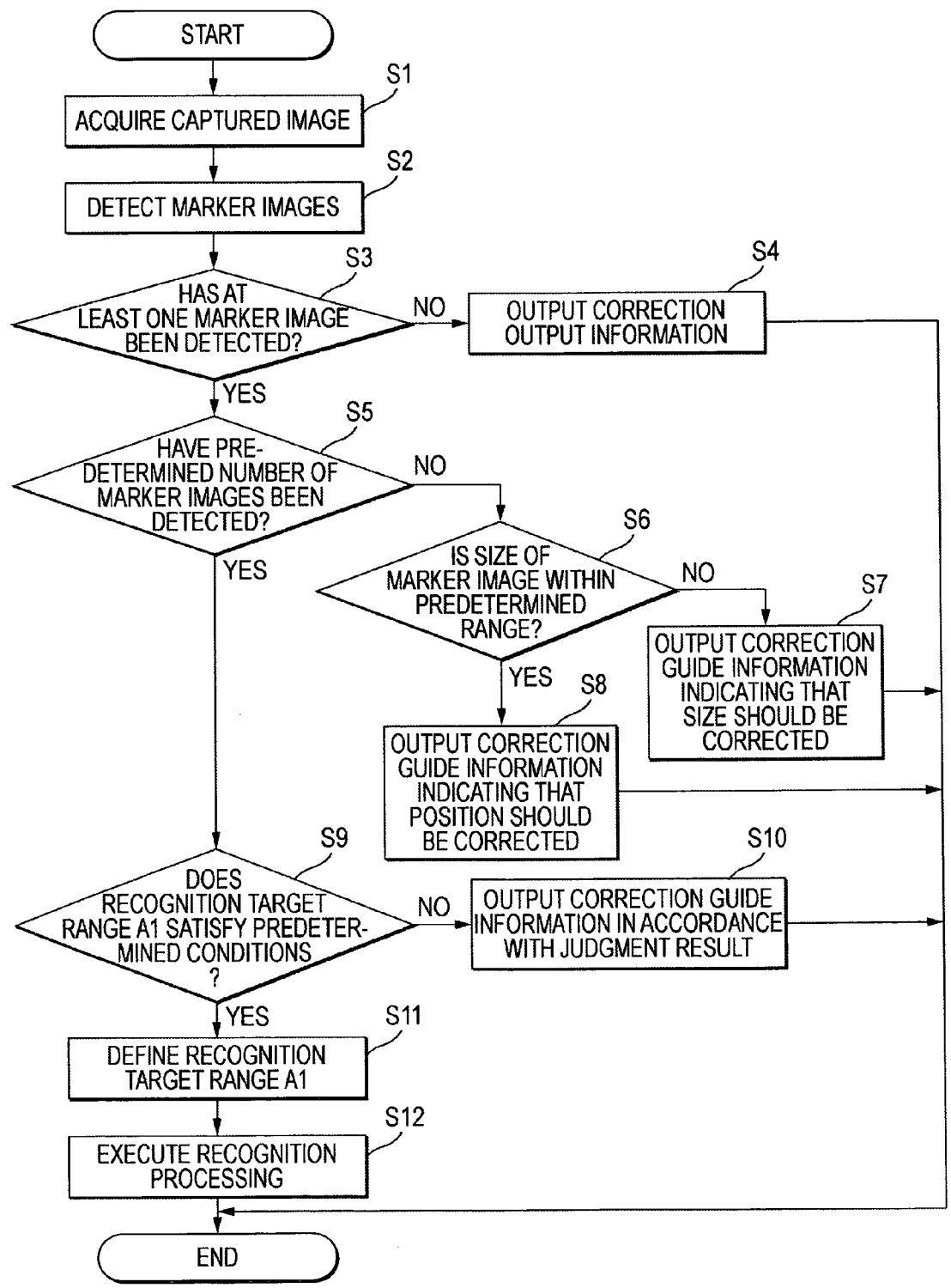
FIG. 3 is a flow chart showing an example of processing executed by the image processing apparatus according to the exemplary embodiment of the invention.
Figure 4:
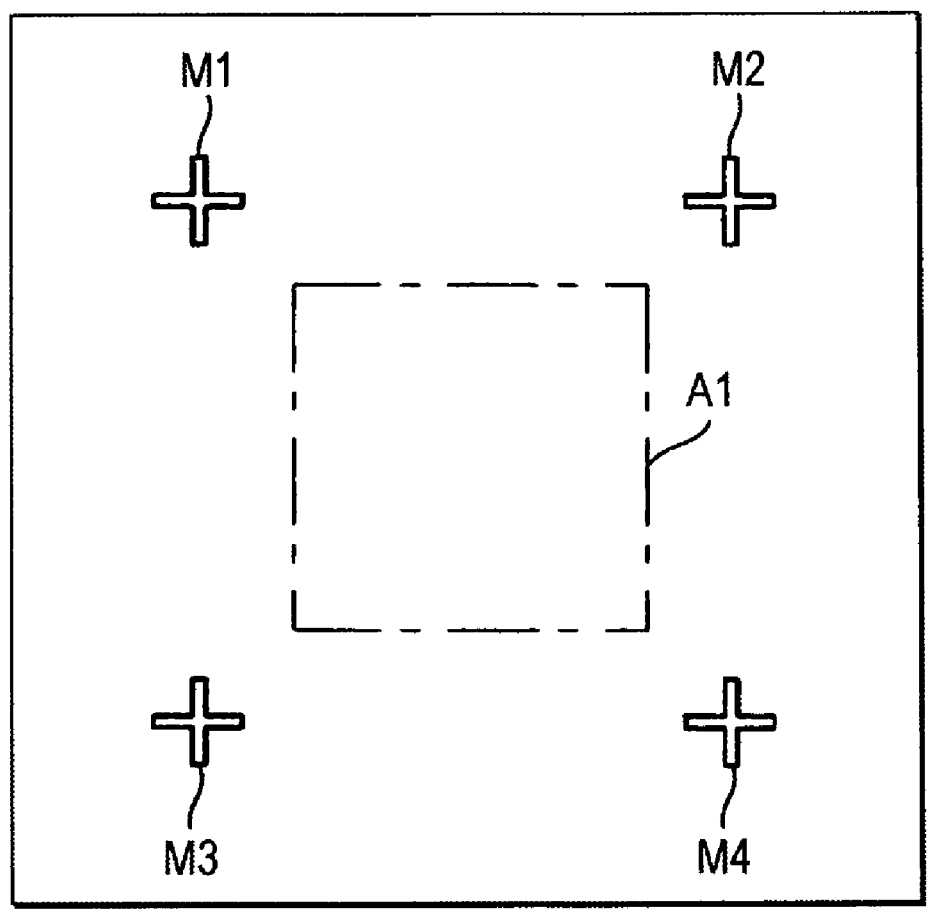
FIG. 4 is a view showing an example of a target image to be captured by the image processing apparatus according to the exemplary embodiment of the invention.

An example in the case where the image processing apparatus 10 captures at least a part of a target image including plural marker images and a recognition target range defined by the plural marker images will be described as the first example with reference to a flow chart of FIG. 3. Here, a specific example will be given on the assumption that a target image including a recognition target range A1 as a rectangular region and four cross marker images (i.e. marker images M1 to M4) disposed near vertexes of the rectangular region, as shown in FIG. 4, is captured.

First, in accordance with a user's instruction operation on the operation section 13, the image-capturing control section 21 controls the image capturing section 15 to capture at least a part of a target image, in order to acquire a captured image (S1).

Successively, the marker-image detection section 22 detects marker images from the captured image acquired in the process of S1 (S2).

Then, the recognition-target-range acquiring section 23 judges based on the detection result of S2 whether or not the recognition target range is included in the captured image in desirable conditions. As a specific example, this process is executed as follows.

That is, the recognition-target-range acquiring section 23 first judges whether or not at least one marker image has been detected in the process of S2 (S3). When no marker image can be detected at all, it can be considered that the marker image is not included in the captured image because the recognition target range Al is not included in the captured image at all from the beginning or a distance to the target image is too short to include the whole of the recognition target range A1 in the captured image. On some occasions, although the marker image is included in the captured image, the marker image cannot be detected because the captured image is out of focus or the recognition target range A1 in the captured image is too small. In this case, the recognition-target-range acquiring section 23 outputs correction guide information in accordance with the judgment result (S4). The correction guide information output thus is message information such as "The image is out of focus or the capturing size is improper" or "Please check the focus, the capturing size, or the capturing place".

When at least one marker image has been detected in the process of S3, the recognition-target-range acquiring section 23 then judges whether or not a predetermined number of marker images have been detected (S5). Here, the predetermined number used for judgment is a number set in advance as the number of marker images used for defining the recognition target range. In the case of FIG. 4, the predetermined number is 4.

When the predetermined number of marker images cannot be detected, it is considered that the recognition target range A1 as a whole is not included in the captured image because the position or the size of the recognition target range A1 with respect to the captured image is different from the desirable conditions. In this case, although the recognition-target-range acquiring section 23 may output correction guide information in accordance with the judgment result, the recognition-target-range acquiring section 23 may further execute the following process in accordance with the size of the detected marker image.

That is, the recognition-target-range acquiring section 23 judges whether or not the marker image detected in the process of S3 is included in a predetermined range (S6). For example, the predetermined range can be decided based on the size of the marker image relative to the size of the recognition target range in the target image and the resolution of the image capturing section 15.

When judgment concludes that the size of the marker image is not included in the predetermined range, the recognition-target-range acquiring section 23 outputs correction guide information indicating that the size of the recognition target range A1 relative to the captured image should be corrected, in accordance with the judgment results of S5 and S6 (S7). For example, the recognition-target-range acquiring section 23 outputs message information such as "The capturing size is improper", "Please make sure of the capturing size", or "Please reduce the magnification".

When judgment concludes that the size of the marker image is included in the predetermined range, the recognition-target-range acquiring section 23 outputs correction guide information indicating that the position of the target image to be captured should be corrected, in accordance with the judgment results of S5 and S6 (SB). For example, the recognition-target-range acquiring section 23 outputs message information such as "The capturing place is shifted improperly" or "Please make sure of the capturing place".

On the other hand, when judgment concludes that the predetermined number of marker images have been detected in the process of S5, the recognition-target-range acquiring section 23 can decide that the recognition target range Al is included in the captured image. Although the recognition processing section 24 may execute recognition processing on the recognition target range immediately, the recognition-target-range acquiring section 23 then judges from the detected marker images whether or not the recognition target range A1 included in the captured image satisfies the predetermined conditions required for execution of recognition processing, as will be described later (S9). When judgment concludes that the recognition target range A1 does not satisfy one of the predetermined conditions, the recognition-target-range acquiring section 23 outputs correction output information in accordance with the judgment result (S10).

For example, the recognition-target-range acquiring section 23 judges whether or not the size of the recognition target range A1 in the captured image is included in a predetermined range. As a specific example, the recognition-target-range acquiring section 23 can judge whether or not the size of the recognition target range A1 is included in a predetermined range, based on judgment as to whether or not the size of each detected marker image is included in a predetermined range or the distance between the marker images is included in a predetermined range. When judgment is made based on the distance between the marker images, for example, the distance between the marker image M1 and the marker image M4 in the captured image is calculated based on the positions of the marker images M1 and M4 in the example of FIG. 4. The recognition-target-range acquiring section 23 can judge whether or not the size of the recognition target range Al is included in the predetermined range, based on judgment as to whether or not the calculated distance is included in the predetermined range.

When judgment concludes that the size of the recognition target range A1 is not included in the predetermined range, there is a possibility that recognition processing cannot be executed because of the problem in resolution of the captured image. Therefore, in accordance with the judgment result, the recognition-target-range acquiring section 23 outputs correction guide information indicating that the size of the recognition target range A1 in the captured image should be corrected. When, for example, judgment concludes that the size of the recognition target range A1 is smaller than the predetermined range, the recognition-target-range acquiring section 23 outputs message information such as "Please capture the image more largely".

The recognition-target-range acquiring section 23 may judge whether or not the brightness of the captured image satisfies predetermined conditions. As a specific example, the recognition-target-range acquiring section 23 judges the brightness of the captured image based on judgment as to whether or not a mean value of concentration values of pixels constituting each marker image (marker image concentration value) is not smaller than a predetermined threshold, a means value of concentration values of pixels constituting a peripheral image region which is the predetermined range in the periphery of each marker image (peripheral image concentration value) is smaller than a predetermined threshold, and a difference between the marker image concentration value and the peripheral image concentration value is not smaller than a predetermined value.

When judgment concludes that the brightness of the captured image does not satisfy the predetermined conditions, there is a possibility that recognition processing cannot be executed because sufficient gradations cannot be obtained. Therefore, the recognition-target-range acquiring section 23 outputs correction guide information indicating that brightness at the time of photographing should be adjusted, in accordance with the judgment result. When, for example, the difference between the marker image concentration value and the peripheral image concentration value is smaller than the predetermined value or the peripheral image concentration value is not smaller than the predetermined threshold, the recognition-target-range acquiring section 23 outputs message information such as "Please capture the image in a brighter place". When the marker image concentration value is smaller than the predetermined threshold, the recognition-target-range acquiring section 23 outputs message information such as "It is too bright. Please check illumination".

The recognition-target-range acquiring section 23 may judge whether or not the captured image is in focus. As a specific example, the recognition-target-range acquiring section 23 generates a concentration value distribution of a specific pixel line including a boundary of a marker image. When a width w from a maximum concentration value to a minimum concentration value in the concentration value distribution is not smaller than a predetermined threshold, the recognition-target-range acquiring section 23 decides that an edge portion of the marker image is blurred and the captured image is out of focus. On the contrary, when the width w is smaller than the predetermined threshold, the recognition-target-range acquiring section 23 decides that the captured image is in focus.

When judgment concludes that the captured image is out of focus, the recognition-target-range acquiring section 23 outputs correction guide information indicating that the captured image should be in focus, in accordance with the judgment result, because there is a possibility that out of focus exerts a bad influence on recognition processing. For example, the recognition-target-range acquiring section 23 outputs message information such as "The image is out of focus".

Moreover, the recognition-target-range acquiring section 23 may judge whether or not the recognition target range A1 is distorted. When, for example, the lens of the image capturing section 15 leans toward the target image remarkably, the shape of the recognition target range A1 in the captured image is distorted to a non-correctable extent. As a specific example, the recognition-target-range acquiring section 23 compares a distance a between the marker images M1 and M2 with a distance b between the marker images M3 and M4 in the captured image. When a difference between the distances a and b is not smaller than a predetermined threshold or a ratio between the distances a and b is not smaller than a predetermined threshold, the recognition-target-range acquiring section 23 decides that the recognition target range A1 is distorted. Similarly, the recognition-target-range acquiring section 23 compares a distance c between the marker images M1 and M3 with a distance d between the marker images M2 and M4. When a difference between the distances c and d is not smaller than a predetermined threshold or a ratio between the distances c and d is not smaller than a predetermined threshold, the recognition-target-range acquiring section 23 decides that the recognition target range A1 is distorted.

When judgment concludes that the recognition target range A1 is distorted, the recognition-target-range acquiring section 23 outputs correction guide information indicating that the target image should be captured to be parallel to the lens of the image capturing section 15, in accordance with the judgment result. For example, the recognition-target-range acquiring section 23 outputs message information such as "Please capture the image in parallel".

When judgments in the aforementioned processes conclude that the recognition target range A1 as a whole is included in the captured image and satisfies the predetermined conditions required for execution of recognition processing, the recognition-target-range acquiring section 23 defines the recognition target range A1 based on the positions of the detected marker images (S11). The recognition processing section 24 executes predetermined recognition processing on the defined recognition target range A1 and outputs a result (S12).

The procedure of the judgment processes carried out by the recognition-target-range acquiring section 23 in the above description is given only as an example. The judgment processes may be performed in a different procedure, or only part of the judgment processes may be performed.

Although the case in which message information is output as correction guide information is taken as an example in the above description, correction guide information may be output in such a process that correction guide images such as predetermined marks representing the contents of these message are displayed on the display section 14 in place of message information or together with message information.

Figure 5:
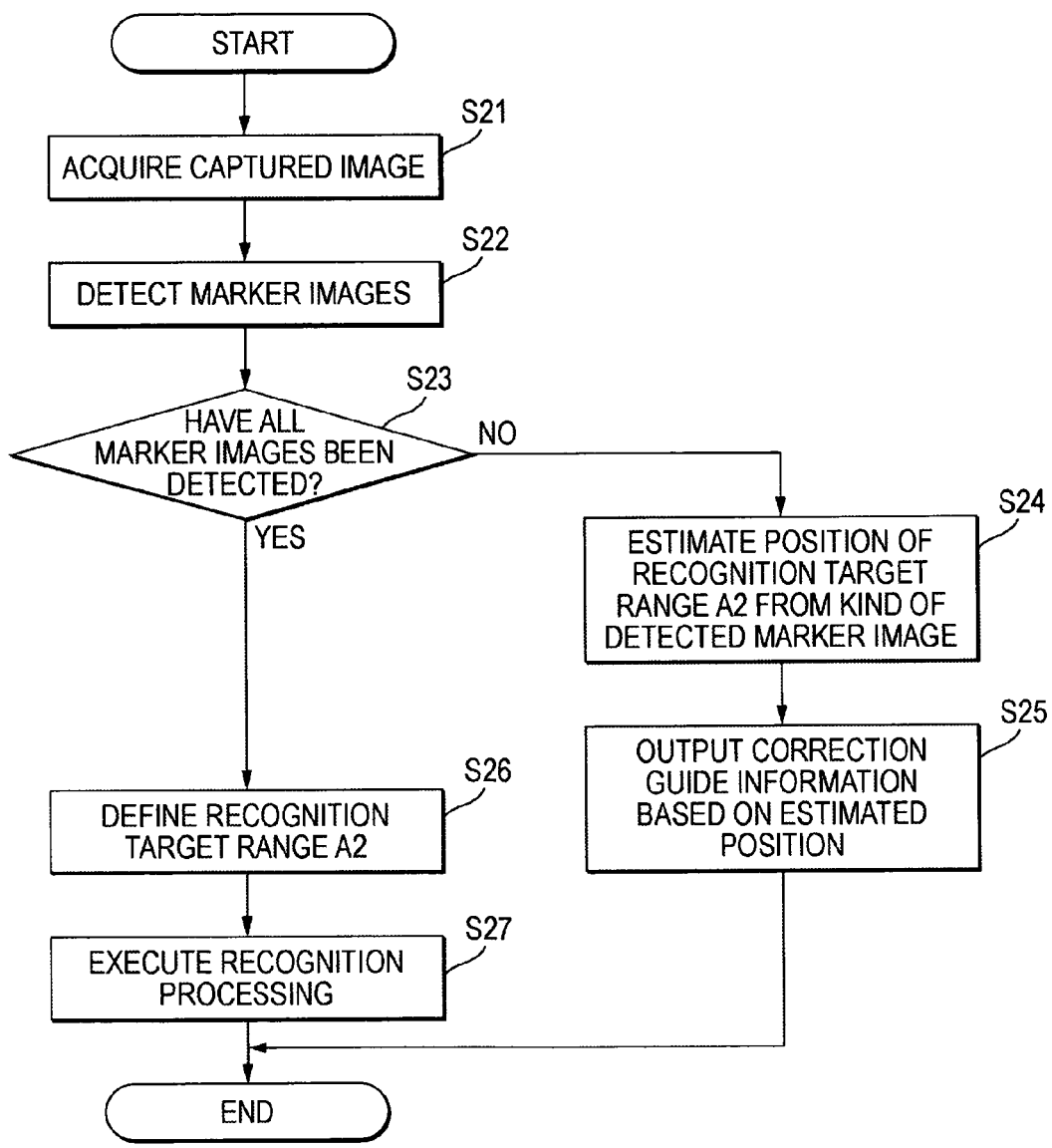
FIG. 5 is a flow chart showing another example of processing executed by the image processing apparatus according to the exemplary embodiment of the invention.
Figure 6A:
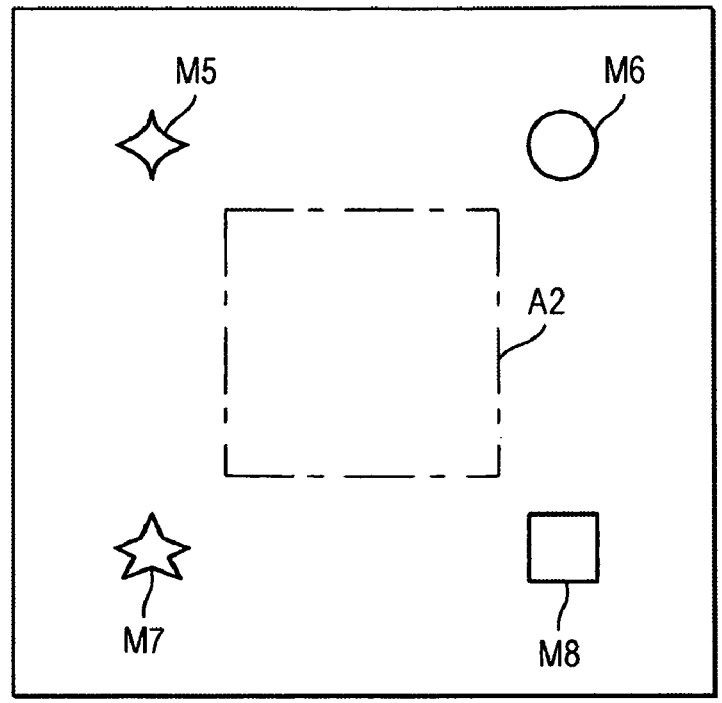
FIGS. 6A and 6B are views showing an example of a target image to be captured by the image processing apparatus according to the exemplary embodiment of the invention and an example of a captured image obtained by capturing the target image.

Next, an example in the case where the image processing apparatus 10 captures at least a part of a target image including a marker-image set formed from plural kinds of marker images and a recognition target range defined by the marker-image set will be described as the second example with reference to a flow chart of FIG. 5. Here, a specific example will be given on the assumption that a target image including a recognition target range A2 as a rectangular region and four marker images (i.e. marker images M5 to M8) different in shape and disposed near vertexes of the recognition target range A2, as shown in FIG. 6A, is captured.

First, in accordance with a user's instruction operation on the operation section 13, the image-capturing control section 21 controls the image capturing section 15 to capture at least a part of a target image, so as to acquire a captured image (S21).

Successively, the marker-image detection section 22 detects the marker images from the captured image acquired in the process of S21 (S22).

Then, similarly to the case of the first example, the recognition-target-range acquiring section 23 judges whether or not the recognition target range A2 is included in the captured image, on the basis of the detection result of the marker images by the marker-image detection section 22. The recognition-target-range acquiring section 23 performs a process of outputting correction guide information in accordance with the judgment result. In this case, the recognition-target-range acquiring section 23 may perform a judgment process on the basis of the size etc. of each detected marker image, similarly to the case of the first example. Here, assume that the recognition-target-range acquiring section 23 performs judgment only on the basis of the kind of each detected marker image, as will be described below.

First, the recognition-target-range acquiring section 23 judges whether or not all the marker images included in the marker-image set used for defining the recognition target range A2 have been detected (S23). Here, since plural kinds of marker images are included in the marker-image set, the recognition-target-range acquiring section 23 may judge whether or not a predetermined number of marker images have been detected and whether or not the kinds of detected marker images are coincident with the kinds of marker images included in the predetermined marker-image set.

When judgment in the process of S23 concludes that all the marker images cannot be detected, the recognition-target-range acquiring section 23 estimates the position of the recognition target range A2 in the captured image, from the kind of each detected marker image (S24).

Figure 6B:
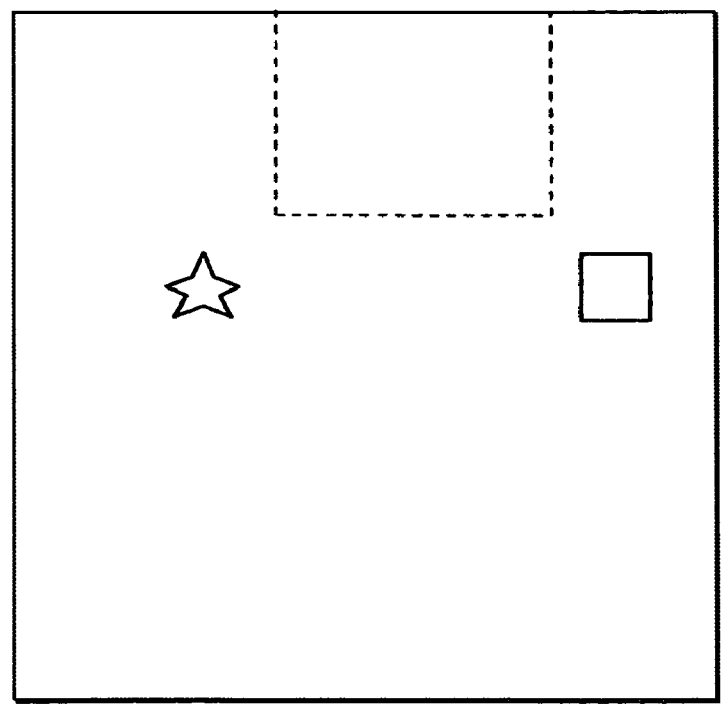

Specific examples will be given as follows. If the kind of a detected marker image should be located to be lower than the recognition target range A2, the recognition-target-range acquiring section 23 estimates that the recognition target range A2 is located in an upper part with respect to the position of the detected marker image. If the kind of a detected marker image should be located on the right side of the recognition target range A2, the recognition-target-range acquiring section 23 estimates that the recognition target range A2 is located on the left side with respect to the position of the detected marker image. An example will be given on the assumption that a captured image shown in FIG. 6B is obtained when a target image shown in FIG. 6A is captured. In this case, the shapes of detected marker images are coincident with the shapes of the marker images M7 and M8. Therefore, it is possible to estimate that the recognition target range A2 is located in an upper part with respect to the detected marker images and positioned toward the top of the captured image as designated by the broken line in FIG. 6B.

The recognition-target-range acquiring section 23 selects and outputs correction guide information to be output, on the basis of the estimated position in the process of S24 (S25). Examples will be given as follows. That is, when the recognition-target-range acquiring section 23 estimates that the recognition target range A2 is located in an upper part of the captured image, the recognition-target-range acquiring section 23 outputs message information such as "Please capture the image more upward". When the recognition-target-range acquiring section 23 estimates that the recognition target range A2 is located in a left part of the captured image, the recognition-target-range acquiring section 23 outputs message information such as "Please capture the image more leftward". Moreover, the recognition-target-range acquiring section 23 may change correction guide information to be output, in accordance with the distance of shift of the estimated position from the center of the screen.

On the other hand, when judgment in the process of S23 concludes that all the marker images have been detected, the recognition-target-range acquiring section 23 defines the recognition target range A2 on the basis of the positions of the detected marker images (S26). The recognition processing section 24 executes predetermined recognition processing on the defined recognition target range A2 and outputs a result (S27).

According to the aforementioned processes, the marker images are detected from the captured image obtained by capturing the target image, and the position of the recognition target range A2 is estimated from the kinds of the detected marker images. Accordingly, correction guide information can be output in accordance with the position of the recognition target range A2. Thus, the user can be notified of which direction the recognition target range A2 is shifted in the captured image so that user friendliness can be improved.

Although the case in which message information is output as correction guide information is taken as an example in the above description, correction guide information may be output in such a process that correction guide images such as predetermined marks representing the contents of these messages are displayed on the display section 14 in place of message information or together with message information. Here, when the direction to be corrected is designated by a correction guide image with an indication of an arrow etc., the user can intuitively know which direction the recognition target range A2 is shifted. In this case, the length etc. of the arrow may be changed on the basis of the distance of shift of the estimated position of the recognition target range A2 in the process of S24.

Figure 7A:
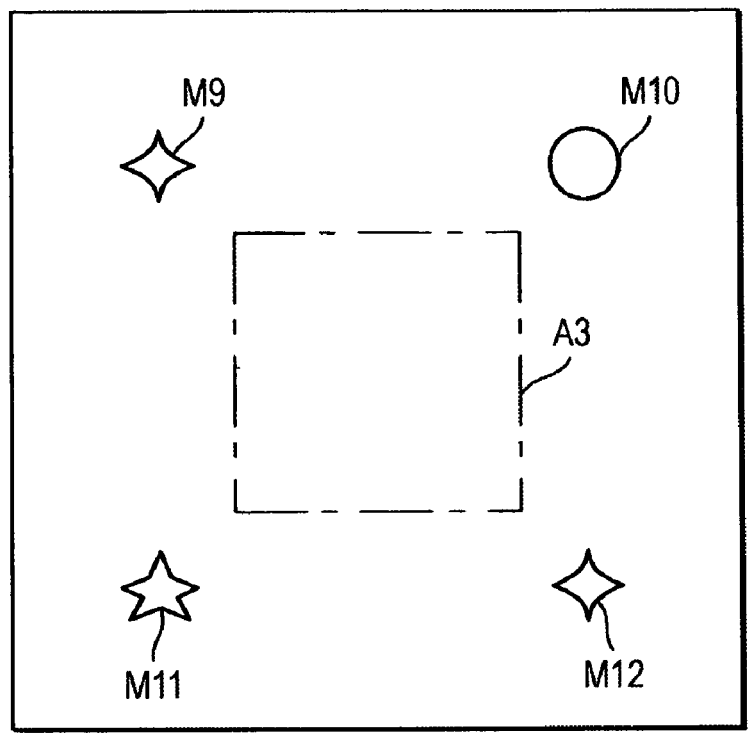
FIGS. 7A and 7B are views showing another example of a target image to be captured by the image processing apparatus according to the exemplary embodiment of the invention and another example of a captured image obtained by capturing the target image.
Figure 7B:
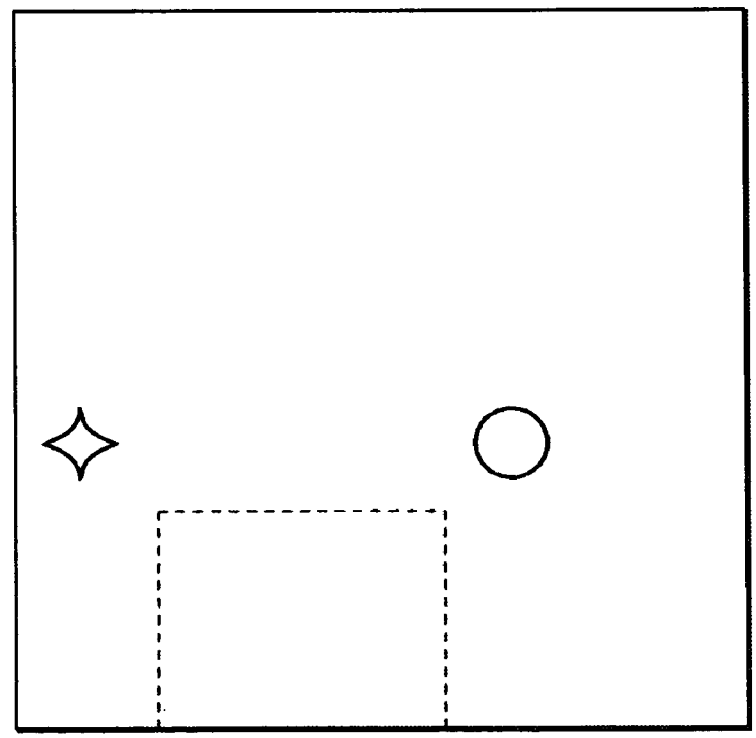

Although description has been made on the case where the marker images included in the marker-image set are totally different in kind, part of the marker images included in the marker-image set may be the same in kind. For example, in an example of FIG. 7A, four marker image M9 to M12 are included in a marker-image set used for defining a recognition target range A3, and the marker images M9 and M12 located on a diagonal line of the rectangular region are the same in kind. In this case, when either of the marker images M9 and M12 is detected singly, the position of the recognition target range cannot be estimated. When two adjacent marker images are detected, the position of the recognition target range A3 can be estimated on the basis of combination of the kinds of the detected marker images. When a captured image shown in FIG. 7B is obtained in the example of the target image shown in FIG. 7A, it is possible to estimate from detection of the two different marker images M9 and M10 that the position of the recognition target range is in a lower part of the captured image as designated by the broken line in FIG. 7B.

In each of the first and second examples, the captured image as a target for detection of the marker images by the marker-image detection section 22 may not be an image captured at a timing of a user's specific instruction such as pushing of a shutter button. When, for example, the image-capturing control section 21 acquires moving images by capturing images, the captured image may be a frame image included in the moving images.

Figure 8:
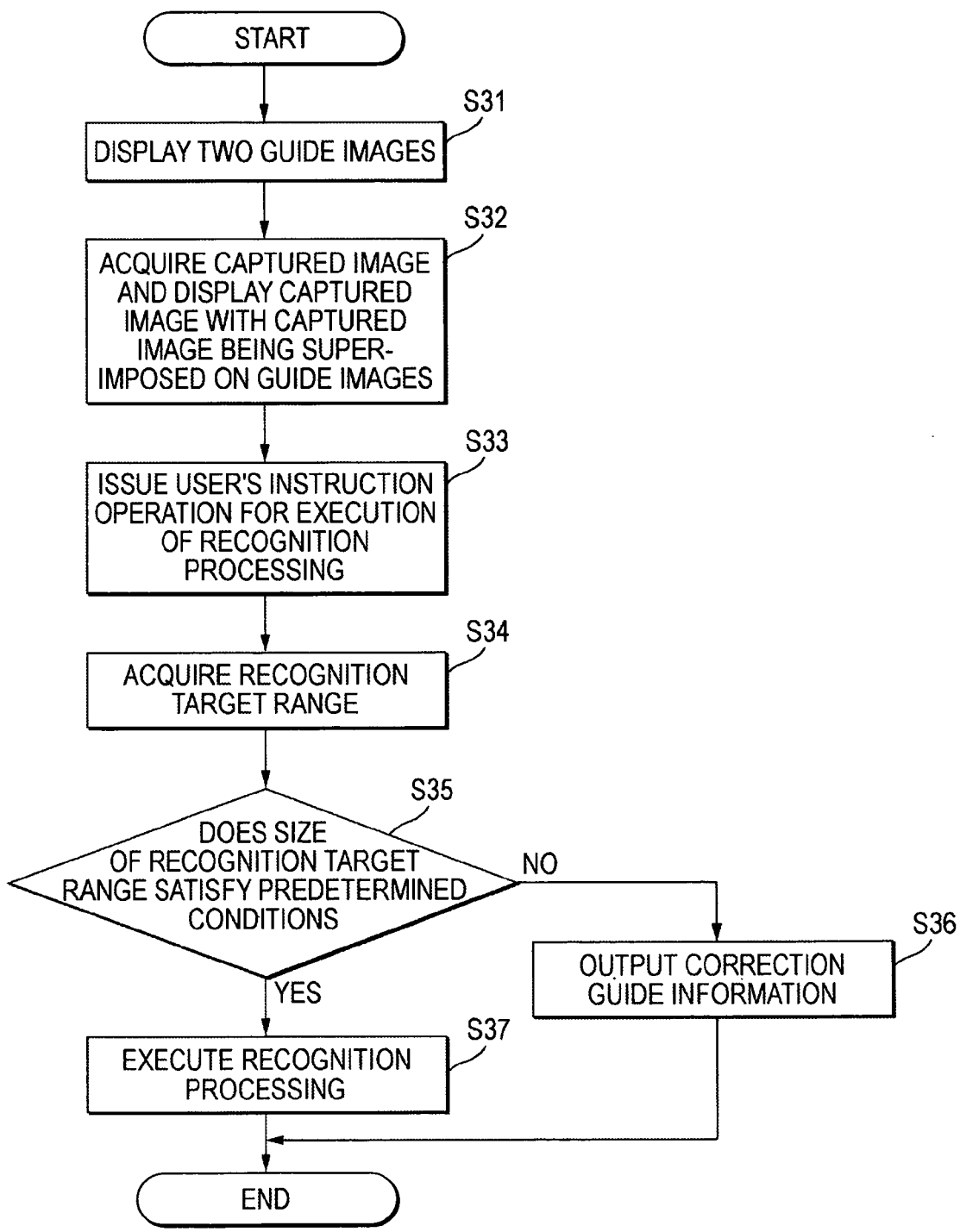
FIG. 8 is a flow chart showing another example of processing executed by the image processing apparatus according to the exemplary embodiment of the invention.

Next, a guide image display example in the case where the image processing apparatus 10 captures at least a part of a target image including a recognition target range will be described as the third example with reference to a flow chart of FIG. 8.

When a predetermined photographic mode such as a two-dimensional code acquisition mode is started on the basis of a user's instruction operation etc., the image-capturing control section 21 first displays two guide images (i.e. a target-region guide image G1 and a size guide image G2) on the display section 14 (S31). Here, the images displayed on the display section 14 are the ones shown in FIG. 9A by way of example.

Here, the target-region guide image G1 is an image representing a recognition processing target region as a recognition processing target. When the recognition target range is photographed to be included in this region, the recognition processing section 24 can limit the size of the recognition target range as the recognition processing target to a predetermined size.

The size guide image G2 is an image representing a recognizable minimum size of the recognition target range in the recognition processing target region indicated by the target-region guide image G1. When the size of the recognition target range in the captured image is too small, it is difficult for the recognition processing section 24 to perform recognition processing on the recognition target range because of the problem in resolution. When the recognition target range is photographed to be larger than the recognizable minimum size represented by the size guide image G2, the recognition processing section 24 can perform recognition processing on the recognition target range.

Figure 9A:
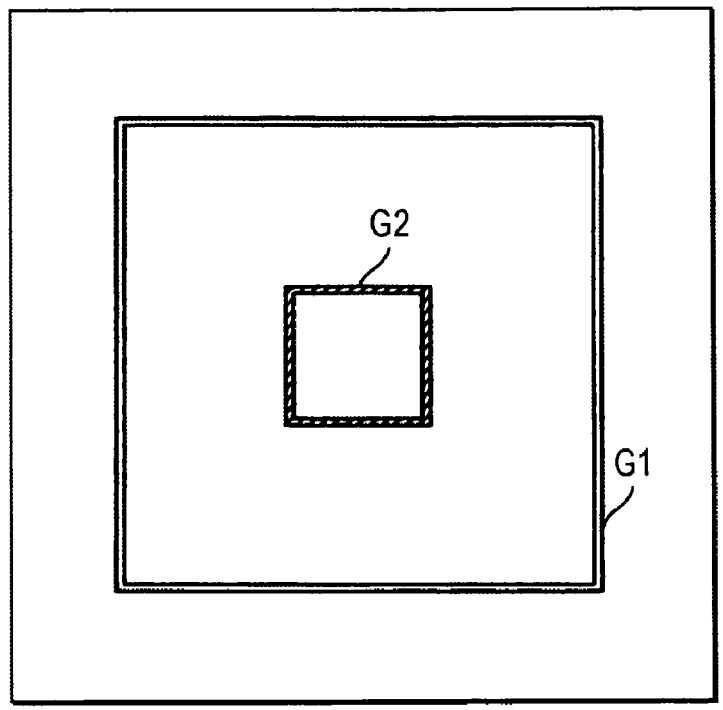
FIGS. 9A and 9B are views showing examples of guide images displayed by the image processing apparatus according to the exemplary embodiment of the invention.

Incidentally, these target-region guide image G1 and size guide image G2 may be images each representing a frame line as shown in FIG. 9A, or may be images each representing positions of four vertexes of a rectangular region by way of example.

Figure 9B:
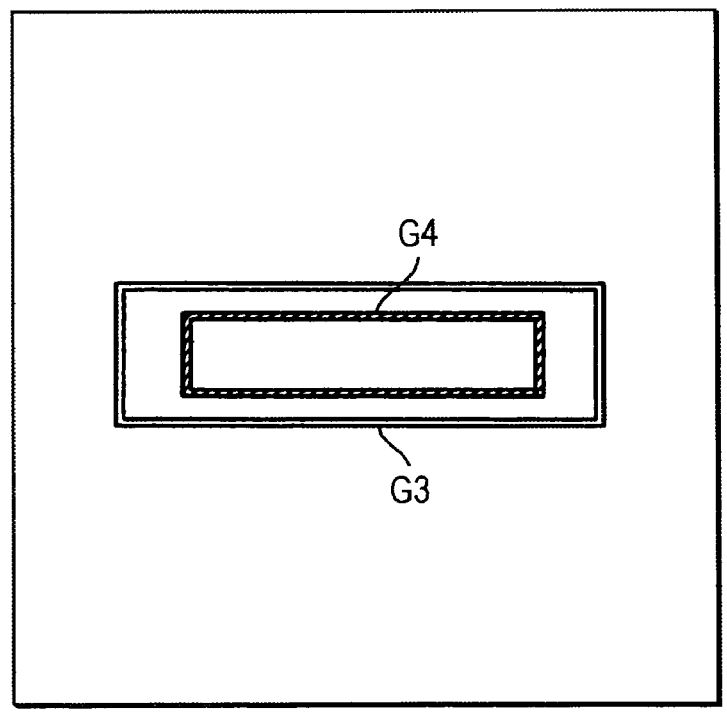

The target-region guide image G1 and the size guide image G2 may be different in accordance with the kind of an image as a recognition processing target decided by a user's instruction operation etc. When, for example, a character image acquisition mode for performing recognition processing on a captured image of a recognition target range including a character image is designated, a target-region guide image G3 and a size guide image G4 as shown in FIG. 9B may be displayed on the display section 14.

Together with display of the guide images due to the process of S31, the image-capturing control section 21 controls the image capturing section 15 to start to capture an image and displays a thus obtained captured image on the display section 14 in the condition that the captured image is superimposed on the two guide images (S32).

Here, the user adjusts the position of the image processing apparatus 10 or the magnification of the image capturing section 15 so that the recognition target range included in the target image is included in the recognition processing target region represented by the target-region guide image G1 and is larger than the recognizable minimum size represented by the size guide image G2 on the display section 14. The user issues an instruction to the image processing apparatus 10 by an instruction operation on the operation section 13 such as pushing of a shutter button, so that the recognition target range is defined and recognition processing is performed on the defined recognition target range (S33).

The recognition-target-range acquiring section 23 acquires the recognition target range on the basis of the captured image at the time point of the instruction operation issued from the user in S33 (S34). Here, arrangement may be made similarly to the first or second example, so that the marker-image detection section 22 first detects marker images and the recognition-target-range acquiring section 23 acquires the recognition target range on the basis of the detected marker images.

Here, the recognition-target-range acquiring section 23 judges whether or not the size of the recognition target range in the captured image satisfies predetermined conditions required for recognition processing, in the following manner (S35). That is, the recognition-target-range acquiring section 23 judges whether or not the recognition target range acquired in the process of S34 is included in the recognition processing target region represented by the target-region guide image G1, and is photographed to be larger than the recognizable minimum size represented by the size guide image G2.

When judgment concludes that the size of the recognition target range does not satisfy the predetermined conditions, correction guide information is output, for example, similarly to the process of S10 in the first example (S36).

On the other hand, when judgment concludes that the size of the recognition target range satisfies the predetermined conditions, the recognition processing section 24 performs recognition processing on the recognition target range acquired in the process of S34 and outputs a result (S37).

According to the aforementioned processes, the user captures the target image while checking the two guide images so that the user can photograph the recognition target range in a desirable size easily even when the user does not know the desirable size of the recognition target range in the captured image.

The processes of acquiring the recognition target range in the aforementioned first to third examples may be used in combination suitably.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an image capturing section that captures at least a part of a target image, which includes a plurality of marker images and a recognition target range defined by the plurality of marker images, to acquire a captured
   a marker-image detecting section that detects the marker images from the captured image;
   a judging section that judges, based on a detection result, whether or not the recognition target range is included in the captured image by judging whether a predetermined number of the marker images have been detected; and
   an output section that, when the judging section judges that the recognition target range is not included in the captured image, outputs guidance for capturing the recognition target range.

2. The image processing apparatus according to claim 1, wherein when the marker-image detecting section does not detect the marker image, the output guidance includes information on a focus of the capturing, a capturing size or a capturing place.

3. The image processing apparatus according to claim 1, wherein when number of the detected marker image is not equal to a predetermined number and a size of the detected marker image is not within a predetermined range, the output guidance includes information on at least one of a capturing size and a magnification of the capturing.

4. The image processing apparatus according to claim 1, wherein when number of the detected marker image is not equal to a predetermined number and a size of the detected marker image is within a predetermined range, the output guidance includes information on capturing place.

5. The image processing apparatus according to claim 1, wherein:
   when number of the detected marker image is equal to a predetermined number, the judgment section further judges at least one of:
      whether or not a size of the recognition target range is within a predetermined range,
      whether a brightness of the captured image satisfies a predetermined condition,
      whether the captured image is in focus, and
      whether the detected recognition target range is not distorted, and the output section outputs the guidance based on a result of the judgment.

6. The image processing apparatus according to claim 1, wherein the recognition target range is decided based on the size of the marker image relative to the size of the recognition target range in the target image and the resolution of the image capturing section.

7. An image processing apparatus comprising:
   an image capturing section that captures at least a part of a target image, which includes a marker-image set made up of plural kinds of marker images and a recognition target range defined by the marker-image set, to acquire a captured image;
   a marker-image detecting section that detects at least a part of the marker images included in the marker-image set, from the captured image;
   a judging section that judges based on a detection result, whether or not the recognition target range is included in the captured image by judging whether a predetermined number of the marker images have been detected;
   a position estimating section that estimates a position of the recognition target range in the captured image based on at least one of the detected marker images and a kind of the at least one detected marker images; and
   an output section that outputs guidance for capturing the recognition target range, based on the estimated position of the recognition target range.

8. The image processing apparatus according to claim 7, wherein the recognition target range is decided based on the size of the marker image relative to the size of the recognition target range in the target image and the resolution of the image capturing section.

9. An image processing apparatus comprising:
a display that displays an image to be captured;
a capturing section that captures the image that includes a plurality of marker images, which is to be subjected to a recognizing processing that judges whether or not a recognition target range is included in the captured image by judging whether a predetermined number of the marker images are included in the captured image;
a guide-image displaying section that displays a first guide image and a second guide image so that the first guide image and the second guide image are superimposed on the image to be captured that includes the recognition target range; wherein:
the first guide image represents a region in which the captured recognition target range is to be included, and
the second guide image represents a minimum size of the captured recognition target range.

10. The apparatus according to claim 9, further comprising:
a judging section that judges whether or not the captured recognition target range is included in a range of the first guide image, and judges whether or not the captured recognition target range is larger than the size of the second guide image; and
a result displaying section that performs display based on a judging result.

11. The image processing apparatus according to claim 9, wherein the recognition target range is decided based on the size of the marker image relative to the size of the recognition target range in the target image and the resolution of the image capturing section.

12. An image processing method comprising:
capturing at least a part of a target image, which includes a plurality of marker images and a recognition target range defined by the plurality of marker images, to acquire a captured image;
detecting the marker images from the captured image;
judging, based on a detection result, whether or not the recognition target range is included in the captured image by judging whether a predetermined number of the marker images have been detected; and
when it is judged that the recognition target range is not included in the captured image, outputting guidance for capturing the recognition target range.

13. The image processing method according to claim 12, wherein the recognition target range is decided based on the size of the marker image relative to the size of the recognition target range in the target image and the resolution of the image capturing section.

14. A computer readable medium storing a program causing a computer to execute image processing, the image processing comprising:
capturing at least a part of a target image, which includes a plurality of marker images and a recognition target range defined by the plurality of marker images, to acquire a captured image;
detecting the marker images from the captured image;
judging, based on a detection result, whether or not the recognition target range is included in the captured image by judging whether a predetermined number of the marker images have been detected; and
when it is judged that the recognition target range is not included in the captured image, outputting guidance for capturing the recognition target range.

15. The image processing according to claim 14, wherein the recognition target range is decided based on the size of the marker image relative to the size of the recognition target range in the target image and the resolution of the image capturing section.

* * * * *